United States Patent [19]
Bauer et al.

[11] 3,723,591
[45] Mar. 27, 1973

[54] PROCESS FOR MAKING ARTICLES FROM SULFUR DIOXIDE-CONJUGATED DIOLEFIN-CYCLOPENTADIENE POLYMER

[75] Inventors: Ronald S. Bauer, Orinda; Howard V. Holler, Oakland, both of Calif.

[73] Assignee: Shell Oil Company, New York, N.Y.

[22] Filed: Nov. 6, 1970

[21] Appl. No.: 87,585

Related U.S. Application Data

[63] Continuation of Ser. No. 742,499, July 5, 1968, abandoned.

[52] U.S. Cl................264/237, 260/79.3 A, 264/28, 264/178, 264/348
[51] Int. Cl.......C08f 13/06, C08f 27/24, C08f 47/14
[58] Field of Search....260/79.3 A; 264/348, 237, 28, 264/178 R

[56] References Cited

UNITED STATES PATENTS

| 3,336,273 | 8/1967 | Youngman | 260/79.3 A |
| 3,444,145 | 5/1969 | Youngman | 260/79.3 A |
| 3,377,324 | 4/1968 | Mostert | 260/79.3 A |

FOREIGN PATENTS OR APPLICATIONS

| 6,601,668 | 8/1966 | Netherlands | 260/79.3 A |

Primary Examiner—James A. Seidleck
Assistant Examiner—C. A. Henderson, Jr.
Attorney—Martin S. Baer and Howard W. Haworth

[57] ABSTRACT

Hydrogenated terpolymers of a linear diolefin such as butadiene, $SO_2$, and cyclopentadiene are converted by quenching from the melt to non-crystalline articles exhibiting unusually high impact resistance and superior tensile yield strength, heat distortion temperature and processing stability, compared to other hydrogenated terpolymeric polysulfones. The articles tend to retain the impact resistance even if later converted by annealing to a partly crystalline structure.

2 Claims, No Drawings

PROCESS FOR MAKING ARTICLES FROM SULFUR DIOXIDE-CONJUGATED DIOLEFIN-CYCLOPENTADIENE POLYMER

This case is a continuation of Ser. No. 742,499, filed July 5, 1968, now abandoned.

BACKGROUND OF THE INVENTION

1. Field of the Invention

This invention relates to hydrogenated terpolymers of a linear diolefin, $SO_2$, and cyclopentadiene, articles produced therefrom, and methods for producing the articles.

2. Description of the Prior Art

In three recently issued U.S. Pat. Nos. 3,336,272; 3,336,273; and 3,336,274, Youngman et al. describe novel polymers produced by hydrogenating unsaturated polysulfones produced from $SO_2$ and a diolefin, or from $SO_2$, a diolefin and an ethylenically unsaturated comonomer. The state of the art prior to the inventions of Youngman et al. is summarized in said patents. Such polymers are also described in French Pat. No. 1,467,715.

Among the polymers described by Youngman et al., the products of U.S. Pat. No. 3,336,272 are hydrogenated copolymers of a single diolefin and $SO_2$; those of U.S. Pat. No. 3,336,274 are hydrogenated terpolymers or quaterpolymers of butadiene, $SO_2$ and linear pentadienes, i.e., isoprene, piperylene or mixtures thereof; and the products of U.S. Pat. No. 3,336,273 are hydrogenated terpolymers or quaterpolymers of a diolefin such as butadiene, $SO_2$, and one of a number of different comonomers.

Typical hydrogenated copolymers of linear conjugated diolefins and $SO_2$, described in U.S. Pat. No. 3,336,272, and typical hydrogenated terpolymers and quaterpolymers of butadiene, $SO_2$, and linear pentadienes, described in U.S. Pat. No. 3,336,274, are characterized by properties which make them particularly adapted for textile uses, but less desirable for other thermoplastic uses, such as in molding and the like. These polymers typically exhibit a relatively high crystallinity and concomitantly low impact strength when converted to molded articles.

Hydrogenated terpolymers of diolefins with $SO_2$ and termonomers enumerated in U.S. Pat. No. 3,336,273 include a group which is of particular utility in non-textile applications; these are relatively non-crystalline polymers in which the termonomer is a vinyl compound such as vinyl chloride or styrene. They differ from all the other termonomers enumerated in said patent in that the hydrocarbon monomers and $SO_2$ are not included in the molecular chain in 1:1 molar relationship. The hydrogenated butadiene-$SO_2$-styrene terpolymers have attractive properties for various thermoplastic uses such as injection molding. However, they have the drawback of relatively low impact strength and very low heat distortion temperature, as well as poor thermal processing stability.

SUMMARY OF THE INVENTION

This invention provides articles from certain hydrogenated polysulfones which exhibit outstanding impact resistance, a high heat distortion temperature, outstanding tensile yield strength and high processing stability compared to articles from other hydrogenated polysulfones. If quenched rather than crystallized from the melt, these articles exhibit and retain the advantages of a non-crystalline polymer, primarily impact strength, even if later converted by annealing to a partially crystalline structure.

An especially preferred embodiment of this invention is represented by articles produced from hydrogenated terpolymers of 1,3-butadiene, sulfur dioxide, and cyclopentadiene, characterized by high molecular weights and stability at their flow temperatures, which make them suitable for use in the preparation of molded products, film, and other plastic applications; by the polymers themselves, and by the method for producing the articles from the polymers.

DESCRIPTION OF THE PREFERRED EMBODIMENTS

In the preferred embodiments, the linear conjugated diolefin used to prepare the copolymers of this invention is 1,3-butadiene. Polymers of this invention may also be produced from other linear conjugated diolefins having from four to about eight carbon atoms per molecule, e.g., 1,3-pentadiene (piperylene), 2-methyl-1,3-butadiene (isoprene), 2,3-dimethylbutadiene, 1,3-hexadiene, 2,4-hexadiene, 1,3- and 2,4-heptadiene, etc.

The cyclic diolefin copolymerized with the linear conjugated diolefin and sulfur dioxide to prepare the unsaturated polysulfones used in this invention is cyclopentadiene.

The polymerization reaction by which the unsaturated copolymeric polysulfones are produced and the hydrogenation reaction by which they are converted into the hydrogenated products of this invention may be carried out in the manner described for preparing the polymers of said Youngman et al. patents. These methods will be summarized only briefly herein.

The unsaturated polysulfones of this invention are typically prepared in polymerization reactions catalyzed by a free-radical initiator such as a peroxide, azo-compound or inorganic oxidizing agent which reacts with sulfur dioxide to yield a redox initiator system. The catalyst may be present in amounts between about 0.01 and 5 percent and preferably between about 0.01 and 1 percent by weight. The reaction may be carried out by emulsion, suspension or precipitation techniques, or in solution. The reaction solvent may, for example, be sulfur dioxide or a mixture of sulfur dioxide with solvents in which the monomeric materials are miscible, such as lower aliphatic alcohols and aliphatic or aromatic hydrocarbons. In a preferred method the reaction is carried out in a solvent which is capable of maintaining the polymerization product in dissolved or swelled condition in which it may be then directly hydrogenated. Such special solvents are, for example, sulfolane or phenolic compounds, such as m-cresol, phenol, p-chlorophenol and the like.

The molecular weight of the unhydrogenated polysulfones may be controlled over a wide range by adjusting the polymerization conditions.

The relative proportions of monomers used in preparing the polymers are not critical. The polysulfones of this invention have an essentially perfectly alternating $-(A-SO_2)-$ structure where A represents one molecule of hydrocarbon monomer, regardless of the ratio of hydrocarbon to sulfur dioxide which is present in the reaction mixture.

The relative proportions of the linear and cyclic diolefin are determined by the concentration of the respective hydrocarbons desired in the product and by the pertinent relative reactivities. Since these reactivities are comparable, any desired ratio of hydrocarbon monomers may generally be achieved. Preferred polymers are those wherein the ratio of butadiene or other linear diolefin to cyclopentadiene is between about 3:1 and about 1:3 and most preferably between about 2:1 and about 1:2, respectively.

Prior to hydrogenation, the unsaturated polysulfone is swollen or dissolved, suitable solvents being sulfolane, fluoroalcohols, such as trifluoroethanol, hexafluoroisopropanol, etc., and especially the phenolic solvents such as phenol, p-chlorophenol, m-cresol, catechol, hydroquinone, pyrrogallol, resorcinol, alpha-naphthol or mixtures thereof. Phenol, chlorophenols, and the cresols are preferred.

The catalyst systems used in the hydrogenation reaction may be heterogeneous or homogeneous. Catalysts are enumerated in said Youngman et al. patents. Homogenous catalysts are preferred since they offer the advantage of being rapidly dispersed throughout the reaction medium and being less readily poisoned, thus permitting the hydrogenation of polysulfones which are only swollen by the solvents. Such homogeneous catalysts include among others the rhodium systems disclosed in copending application Ser. No. 417,482, filed Dec. 10, 1964, now U.S. Pat. No. 3,489,786, issued Jan. 13, 1970, the descriptions of which are incorporated herein by reference. Preferred catalysts of this type are the rhodium halide complexes such as trichlorotris(triphenylarsine)rhodium(III), and chlorotris(triphenylphosphine)rhodium(I). The amount of such catalyst used is sufficient to provide from about 50 to 2,000 ppm and preferably between 100 and 1,000 ppm rhodium based on the polymer.

In the hydrogenation step, the presence of excess sulfur dioxide should be avoided since it tends to poison the catalyst.

The hydrogenation reaction temperature may be from about room temperature, i.e., about 20° C to about 200° C. Temperatures between about 80° and 130° C are preferred. The rate of hydrogenation will depend upon the particular polymer being hydrogenated, the solvent, temperature, catalyst, solution viscosity, pressure, etc. Although hydrogenation would proceed slowly at one atmosphere of hydrogen pressure, it is normally desirable to use a large excess of hydrogen; hydrogen pressures of up to 10,000 psi or higher may be used, the preferred range being between about 500 and 2,000 psi. The hydrogen may be bubbled through the polymer-containing solution or may be charged into a closed reaction vessel under pressure and then mixed with a solution by suitable means.

The hydrogenation process as disclosed only affects the ethylenically unsaturated linkages of a molecule and does not reduce the stable sulfone portions of the polymer. Desirable product properties are obtained by reducing the original ethylenic unsaturation by at least about 50 percent and, preferably by about 100 percent. The hydrogenated polysulfones of this invention are stable. They melt and dissolve in suitable solvents at temperatures well below those at which decomposition occurs. It has been found that melting points may be tailored within certain limitations by varying the degree of hydrogenation.

The hydrogenated polymers have molecular weights between about 20,000 and 1,000,000 as characterized by intrinsic viscosities of from about 0.5 to 5.5 dl/g, determined in a 1:1 mixture of p-chlorophenol and m-cresol at 25° C.

The articles of this invention are produced by converting a composition whose polymer content consists at least to the extent of about 80 percent by weight of the above-described polymers to a melt, and quenching the melt. Quenching consists of cooling the melt at a sufficiently rapid rate to produce a solidified article which shows no crystallinity by X-ray diffraction, as indicated by identity of the X-ray diffraction patterns of the melt and the solidified article. Ordinarily the melt is shaped to a desired shape before being quenched, as by extrusion through a die orifice of an extruder, injection into a coolable mold, or the like.

The rate of cooling required for satisfactory quenching will depend in part on the chemical composition of the polymer and on the configuration of the shape to be quenched, and is readily determined for each composition and shape. Satisfactory quenching is obtained when the polymer melt temperature is reduced at the rate of about 20° C per minute or more. Cooling rates as low as 10° C per minute may provide satisfactory quenching for at least some of the polymers.

Articles produced according to this invention generally have an impact resistance of at least about 1.0 ft-lb/inch and in many cases between 2 and 3 ft-lb/inch, determined by the notched Izod impact test at 23° C.

The following examples are provided to illustrate the manner in which the invention is carried out and to illustrate by comparison the outstanding properties of the articles of this invention. It is to be understood that the examples are given for the purpose of illustration and the invention is not to be regarded as limited to the specific compounds or conditions recited therein. Unless otherwise illustrated, parts and percentages disclosed in the examples and throughout the specification are given by weight.

EXAMPLE 1

Terpolymerization

An unsaturated polysulfone was prepared by terpolymerizing butadiene, sulfur dioxide, and cyclopentadiene as follows:

A 4-liter stirred reactor was charged with 2 liter deareated water, 8 ml Triton X–100, 300g 1,3-butadiene, 67g cyclopentadiene and 80g $SO_2$. After cooling the reaction mixture to 8° C, the polymerization was started by introducing 2 ml of a 20 percent aqueous ammonium persulfate solution. During the polymerization additional initiator solution, cyclopentadiene, and $SO_2$ were continuously metered into the reactor at 0.18g/min., 1.0g/min. and 1.7g/min., respectively. The temperature of the reactor contents was kept between 8° C and 12° C throughout the run. After 50 minutes the reaction was terminated by discharging the reactor contents into about 8 liter of methanol. The product was filtered, washed several times with water to remove the emulsifier, and then given a final wash with methanol.

There was obtained 207g of white polymer having 36 percent mole cyclopentadiene-derived units in the hydrocarbon portion and having an inherent viscosity of 0.75 dl/g in 1:1 p-chlorophenol:m-cresol at 25° C.

Hydrogenation

The above polymer plus an additional 191g of a polymer prepared following the same procedure were dissolved in 8 liter m-cresol. This solution was charged into an 11-liter autoclave along with 2.0g chloro(tristriphenylphosphine)rhodium (I) and 5.0g triphenylphosphine. The autoclave was sealed, purged with hydrogen, heated to 100° C and pressurized to 3,500 psi with hydrogen. After 16 hours the resulting mixture was flooded with methanol to obtain a polysulfone which was completely hydrogenated as shown by infrared analysis and had a melting point of 197° C and an intrinsic viscosity of 1.24 dl/g.

Properties of Articles Produced from the Polymer

By compression molding and quenching the melt, the polymers yielded clear, tough films.

The hydrogenated polymer was stabilized with 0.25 percent triisooctyl phosphite, and a combination of two phenolic antioxidants; it was milled at 400° F for about 1 minute. The intrinsic viscosity of the milled polymer was 1.08 dl/g. Test specimens molded at about 410° F from the milled polymer gave the properties shown in Table 1.

EXAMPLE 2

Polymer was prepared in a similar manner as in Example 1, except that a different amount of cyclopentadiene, namely 100g was employed as the initial charge. The resulting polymer had 58 mol percent cyclopentadiene-derived units in the hydrocarbon portion. The completely hydrogenated polymer had a melting point of 229° C and an intrinsic viscosity of 0.9 dl/g. The properties of compression molded and quenched test specimens produced from the stabilized polymer are shown in Table 1.

TABLE 1

| | Example 1 | Example 2 |
|---|---|---|
| Melting Point, °C | 196 | 229 |
| I.V., dl/g (m-cresol/p-chlorophenol) | 1.08 | 0.9 |
| Impact Strength, ft-lb/inch notch, at 23°C | 2.88 | 2.1 |
| Tensile Yield Point, psi | 9,500 | 11,000 |
| Elongation at yield, % | 21 | 5 |
| Tensile Strength at break, psi | 7,200 | 9,000 |
| Heat Distortion at 264 psi, °C | 81 | 106 |

EXAMPLE 3

Comparison with Other Hydrogenated Polysulfones

Compression molded and quenched test specimens of polymers prepared in Examples 1 and 2 were compared with similarly prepared test specimens of the following hydrogenated polysulfones of the type described in said Youngman et al. patents. Table 2 states the results in qualitative terms and Table 3 presents numerical values.

In listing the polymers, the following abbreviations are employed: BD = butadiene; CPD = cyclopentadiene; P = piperylene; I = isoprene; CHD = cyclohexadiene; COD = cyclooctadiene; S = styrene. H indicates that the polymer was hydrogenated.

TABLE 2

| Polymer | Crystallinity | Impact resistance | Heat Distortion Temperature | Tensile Yield Strength | Processing Stability[a] |
|---|---|---|---|---|---|
| H(BD-CPD) | Low | High | Medium to high | High | Very good |
| H(BD-P) | High | Low | Low to medium | Low | Good |
| H(BD-CHD) | Low | Low | High | | Poor |
| H(BD-COD) | Low | Low | Low | | Poor |
| H(BD-S) | Low | Low | Low | Low | Poor | a) As indicated by reduction of intrinsic viscosity after milling for 1–2 minutes at about 10° C above the polymer melting point.

TABLE 3

| Polymer | Hydrocarbon content, percent mole | | | | Izod impact, ft.-lbs./inch | Tensile yield strength, p.s.i. | Heat distortion temp., °C at 264 p.s.i. |
|---|---|---|---|---|---|---|---|
| | BD | CPD | P | S | | | |
| H(BD-CPD): | | | | | | | |
| Example 1 | 64 | 36 | | | 2.88 | 9,500 | 81 |
| Example 2 | 42 | 58 | | | 2.1 | 11,000 | 106 |
| H(BD-P) | 60 | | 40 | | 0.44 | a 6,200 | 70 |
| H(BD-S) | 61 | | | 39 | 0.87 | a 7,200 | 66 | a No yield point—brittle fracture (no necking).

It can be readily seen from these tables that the test specimens of the hydrogenated butadiene-cyclopentadiene terpolymers of Examples 1 and 2 have outstandingly high impact values and high tensile yield strength as well as high heat distortion temperatures, compared to each of the other terpolymers. The polymers of this invention are the only hydrogenated diolefin-SO$_2$-termonomer polysulfones which have been found to be convertible to articles characterized by this combination of outstanding properties, which is unique in this family of polysulfones and not expected, based on experiments with other hydrogenated terpolymers.

EXAMPLE 4

The properties of butadiene-SO$_2$-cyclopentadiene polymers of this invention can be varied within a fairly wide range by varying the ratio of the hydrocarbon monomers. This is illustrated by data in Table 4. The polymers whose properties are given in the table were prepared in approximately the manner of Examples 1 and 2, the amount of cyclopentadiene in the original reaction mass being varied to control the ratio of hydrocarbon monomer units in the polymer.

TABLE 4

| Cyclopentadiene Content, % mole | Melting Point, °C | Heat Distortion Temperature, °C |
|---|---|---|
| 70 | 243 | 112 |
| 54 | 229 | 92 |
| 44 | 207 | 87 |
| 36 | 197 | 81 |

EXAMPLE 5

Crystallization studies were carried out on polymer produced according to Example 2.

Thin layers of the polymer were cooled from the melt at the rate of about 5° C per minute. The resulting free films of the polymer were extremely brittle, hazy, and had a spherulitic structure which was readily observable with an optical microscope. The films were subjected to differential thermal analysis (DTA). By comparison with DTA data obtained on a similar polymer of known crystallinity, the crystallinity of the films was estimated to be about 20 percent.

Samples of the same polymers were melted and then cooled at a controlled rate of 20° C per minute in a differential thermal analysis apparatus. No recrystallization peak was observed, indicating that the cooled polymer had the non-crystalline structure which is typical of the quenched polymer.

When this particular polymer was cooled in a differential thermal analysis apparatus at the rate of 10° C per minute, there was evidence of a substantial amount of cyrstallization.

Samples of the same polymer were quenched from the melt by cooling in ice water. The quenched films were optically clear and showed no crystalline structure under the optical microscope. They also showed no crystallinity by X-ray diffraction, as evidenced by the fact that the X-ray diffraction diagram of the film was substantially identical with that of the melt. These quenched films were subsequently annealed by heating for 48 hours at various temperatures. Samples annealed at 80° and 100° C, which is below the glass transition temperature ($t_g$ determined by torsional damping was between 110° and 120° C) did not show any increase in crystallinity. Samples annealed at 120° C exhibited about the same degree of crystalline order as the slowly cooled sample.

Surprisingly, the annealed polymer is not brittle but maintains the physical properties of the quenched polymer. This was demonstrated by obtaining Izod impact tests on injection-molded samples. The Izod impact value of the quenched sample was 0.92 ft-lb/in. notch and that of quenched sample annealed 48 hours at 120° C was 0.96 ft-lb/in. Thus, the latter sample had at least maintained its impact resistance in spite of having acquired a crystalline structure. By contrast, a sample directly crystallized from the melt is so brittle that its Izod value would be nearly zero.

We claim as our invention:

1. A method for producing solid thermoplastic articles having an Izod impact resistance of at least about 1.0 ft-lb/in notch, and exhibiting no crystallinity, as tested by X-ray diffraction, upon being solidified from a melt, which comprises:
   a. melting a polymer compositions, consisting essentially of a normally solid hydrogenated copolymer of (1) sulfur dioxide, (2) a linear conjugated diolefin having from four to eight carbon atoms per molecule, and (3) cyclopentadiene, said copolymer consisting essentially of recurring —$SO_2$— units alternating with recurring hydrocarbon radicals derived from one molecule of one of said diolefins and having in the unhydrogenated state one ethylenically unsaturated site per diene unit, the weight ratio of linear diolefin-derived radicals to cyclopentadiene-derived radicals being between about 3:1 and 1:3, respectively, and the residual ethylenic unsaturation in said hydrogenated copolymer being essentially zero;
   b. shaping the resulting melt; and
   c. cooling it at a rate of at least 20° C per minute.

2. The method according to claim 1 wherein said linear diolefin is 1,3-butadiene.

* * * * *